No. 800,355. PATENTED SEPT. 26, 1905.
J. C. G. BRADLEY.
FENDER.
APPLICATION FILED APR. 13, 1905.

Witnesses
Inventor
John C. G. Bradley
By Attorney

UNITED STATES PATENT OFFICE.

JOHN C. G. BRADLEY, OF BROOKLYN, NEW YORK.

FENDER.

No. 800,355.   Specification of Letters Patent.   Patented Sept. 26, 1905.

Application filed April 13, 1905. Serial No. 255,433.

*To all whom it may concern:*

Be it known that I, JOHN C. G. BRADLEY, a citizen of the United States, and a resident of Brooklyn, in the county of Kings and State of New York, have invented certain new and useful Improvements in Fenders, of which the following is a specification.

My invention relates to non-projecting fenders or life-saving devices for use upon vehicles, preferably those propelled by electricity; and the object of my invention is to provide economical means for automatically throwing downward the forward end of the fender to prevent a person from being hurt by the wheels of the vehicle.

In my invention no current is required to hold the fender in its normal position, and consequently current is only used when some obstacle comes in contact with it.

My invention will be described as applied to an electric car with reference to the accompanying drawings, in which—

Figure 1:
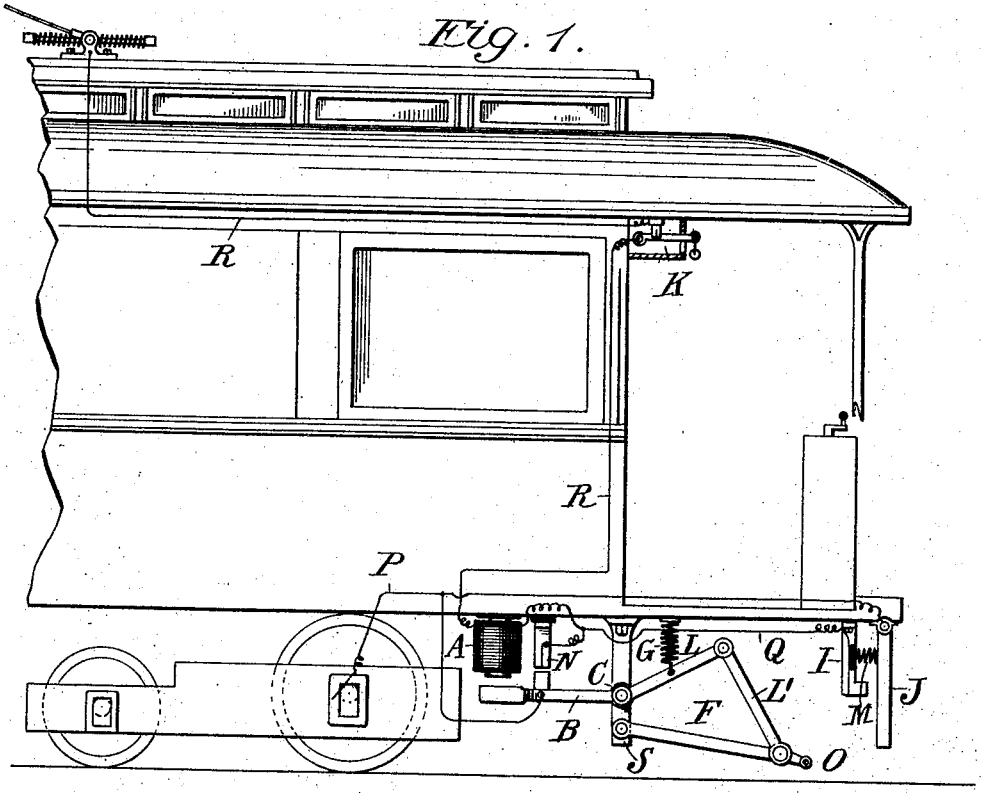
Figure 2:
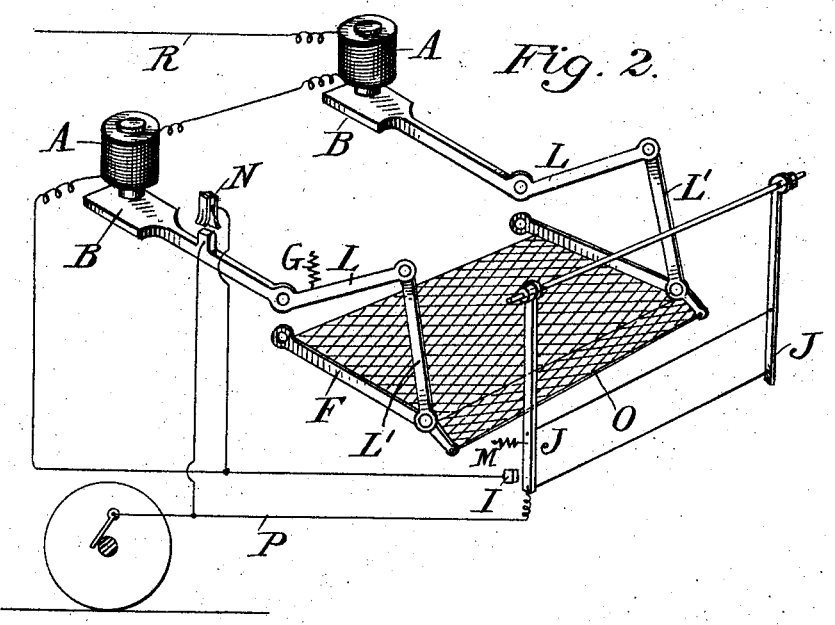

Figure 1 is a side elevation of the front portion of an electric car provided with the improvements of my invention. Fig. 2 is a perspective view of the operating mechanism of my invention.

In operation the fender or guard F is hung on rigid support S, attached to car-bottom, and is supported by the fulcrum-lever L, loosely attached to support S at C and by the link L', by which the fender is held in a position so that its front edge O lies close to the ground, about two inches above it. Firmly attached to the fulcrum-lever L is armature B.

Under the car-bottom are attached magnets A and the knife-switch N and spring G.

Suspended from the car in front of the fender is a feeler J, connected by spring M to contact-switch I. Above the car-platform within easy reach of the motorman is a circuit-breaking switch K.

P is the metallic circuit between the axle of the car and the feeler J.

Q is the metallic circuit between the contact-switch I and the magnet A.

R is the metallic circuit between the magnet A and the trolley-pole.

When the feeler J is hanging normally, the metallic circuits P, Q, and R are open and fender F is held up by the spring G, attached to fulcrum-lever L. When the feeler J is pressed back by contact with a body or obstruction, it strikes the switch I, thus closing the metallic circuit and causing the magnets to draw up the armature B, whereby lever L presses down link L', causing the bottom of the fender O to rest firmly on the ground. In this operation the knife-switch N becomes firmly closed, keeping the circuit in the magnet and keeping the fender in a rigid position until the circuit is broken at switch K, when the armature drops and raises the fender to its normal position.

What I claim is—

1. In a fender or life-guard, the combination of a vehicle, with a fender or guard adapted to fall into operating position, of rods or supports and a spring for normally holding up the fender, of an electromagnet provided with an armature for drawing the fender into operating position, a feeler and a contact-switch adapted to be actuated by the backward movement of the feeler to energize the electromagnet thereby allowing the fender to drop, substantially as described.

2. In a fender or life-guard, the combination of a vehicle, with a fender or guard adapted to fall into operating position, of supports and spring for normally holding up the fender, of an electromagnet provided with an armature for drawing the fender into operating position, a knife-switch for keeping the electromagnet in circuit after the guard has fallen into position, a feeler and a contact-switch in connection with a metallic circuit adapted to be actuated by the backward movement of the feeler to energize the electromagnet.

3. In a fender, the combination of a car or vehicle, with a fender or guard adapted to fall into operating position, of supports and spring for normally holding up the fender, of an electromagnet provided with an armature for drawing the fender into operating position, a knife-switch for keeping the electromagnet in circuit after the guard has fallen into position, a normally open electric circuit, a switch adapted to close by coming in contact with a person and a switch to break the circuit, all substantially as described.

4. A fender comprising a support, a frame hinged thereto an armature and connections between the armature and frame, an electromagnet coöperating with said armature to depress the frame, means to automatically energize the magnet to depress the frame and means whereby when the magnet is deënergized the frame will be raised to its initial position.

Signed at the city of New York, in the county of Kings and State of New York, this 25th day of March, A. D. 1905.

JOHN C. G. BRADLEY.

Witnesses:
ALBERT SCHIFFERS,
OTTO W. SCHIFFERS.